United States Patent
Thorailler et al.

(10) Patent No.: US 9,649,937 B2
(45) Date of Patent: May 16, 2017

(54) CONTROL AND DISPLAY MODULE FOR A MOTOR VEHICLE, AND MANUFACTURE METHOD

(71) Applicant: Valeo Systemes Thermiques, Le Mesnil Saint Denis (FR)

(72) Inventors: Maryline Thorailler, Ormesson sur Marne (FR); Frédéric Autran, Paris (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 2 days.

(21) Appl. No.: 14/366,013

(22) PCT Filed: Dec. 21, 2012

(86) PCT No.: PCT/FR2012/000549
§ 371 (c)(1),
(2) Date: Jun. 17, 2014

(87) PCT Pub. No.: WO2013/093247
PCT Pub. Date: Jun. 27, 2013

(65) Prior Publication Data
US 2014/0356595 A1      Dec. 4, 2014

(30) Foreign Application Priority Data

Dec. 23, 2011    (FR) .................................... 11 04060

(51) Int. Cl.
*B32B 38/14*    (2006.01)
*B60K 37/06*    (2006.01)
(Continued)

(52) U.S. Cl.
CPC ............ *B60K 37/06* (2013.01); *B32B 37/003* (2013.01); *B32B 37/1018* (2013.01);
(Continued)

(58) Field of Classification Search
CPC ..... B60K 37/06; B32B 37/003; B32B 37/018; B32B 38/145
See application file for complete search history.

(56) References Cited

U.S. PATENT DOCUMENTS

| 2010/0245705 A1 | 9/2010 | Nakagawa et al. |
| 2011/0033720 A1* | 2/2011 | Fujita ........................ C09J 7/00 428/522 |

(Continued)

FOREIGN PATENT DOCUMENTS

FR    2 958 422 A1    10/2011

OTHER PUBLICATIONS

International Search Report for corresponding International Application No. PCT/FR2012/000549, mailed Apr. 12, 2013 (2 pages).

*Primary Examiner* — Jeff Aftergut
*Assistant Examiner* — Jaeyun Lee
(74) *Attorney, Agent, or Firm* — Osha Liang LLP

(57) ABSTRACT

The invention relates to a method for manufacturing an interface module (1), the interface module (1) including a display member (7) that is to be visible through a transparent slab (S), characterized in that it comprises the steps of: silk-screening an opaque ink (9) onto certain areas of a film (3) so as to define frames or symbols; depositing adhesive (C) between the film (3) on the silk-screened ink (9) side, and the transparent slab (S) of the interface module (1); and adhering, and laminating the film (3) onto the transparent slab (S) of the interface module (1). The invention also relates to the associated interface module produced according to said method.

6 Claims, 2 Drawing Sheets

(51) Int. Cl.
  *B60K 35/00* (2006.01)
  *G02F 1/1333* (2006.01)
  *G06F 3/041* (2006.01)
  *B32B 37/00* (2006.01)
  *B32B 37/10* (2006.01)
  *B32B 38/00* (2006.01)

(52) U.S. Cl.
  CPC ............ *B32B 38/145* (2013.01); *B60K 35/00* (2013.01); *G02F 1/13338* (2013.01); *G02F 1/133308* (2013.01); *G06F 3/0412* (2013.01); *B60K 2350/1028* (2013.01); *B60K 2350/2039* (2013.01); *G02F 2001/133331* (2013.01); *G06F 2203/04103* (2013.01); *Y10T 428/24802* (2015.01); *Y10T 428/24868* (2015.01)

(56) References Cited

U.S. PATENT DOCUMENTS

| | | | |
|---|---|---|---|
| 2011/0122090 A1 | 5/2011 | Suetomi et al. | |
| 2011/0254790 A1* | 10/2011 | Suzuki | B32B 7/12 345/173 |
| 2012/0008266 A1* | 1/2012 | Nomura | G06F 3/0414 361/679.01 |
| 2013/0040123 A1* | 2/2013 | Cho | C09J 133/08 428/220 |

* cited by examiner

CONTROL AND DISPLAY MODULE FOR A MOTOR VEHICLE, AND MANUFACTURE METHOD

The present invention relates to a human-machine interface module comprising a display member, notably for a motor vehicle. In particular, a display member of this type may be formed by a backlit symbol or a screen, for example a multi-function TFT screen or an LCD display screen. This display member may include a touch panel for inputting information such as commands More specifically, an interface module of this type can be used for controls located near the driver, on the dashboard or on the center console located between the front passenger seats of the motor vehicle. In its screen form, the display member may, for example, control functions such as air conditioning, an audio system, a telephone communication system or a navigation system. In its symbol form, the display member may, for example, control simple functions such as the "warning" function. The combination of these display members with these controls creates control and display members. The invention relates more specifically to the method of manufacturing said control and display module and to the module itself These screens or symbols may advantageously be covered by an upper transparent touch panel, allowing users to input commands The touch panel enables the pressure of a user's finger, for example, to be located, using a capacitive or resistive method. The location of the pressure can then be related to input fields corresponding to different options (accept, reject, return to previous menu, etc.).

In order to protect the interface modules comprising display members such as symbols and/or screens, which may or may not have touch panels, the modules are normally covered with a transparent sheet and a frame, which, by means of a cut-out opaque film, delimits either the window in which the screen is visible or the graphic representation of the symbol.

The stacking of these different layers results in the production of a screen of considerable thickness, while giving rise to excessive production costs.

In order to remedy, or at least partially remedy, the aforementioned defects, the invention proposes a method of manufacturing an interface module, the interface module comprising a display member intended to be visible through a transparent panel, characterized in that it comprises the following steps:

an opaque ink is screen-printed onto certain areas of a film to delimit frames or symbols, adhesive is deposited between the film, on the same side as the screen-printed ink, and a transparent panel of the interface module, and the film is bonded and laminated onto the transparent panel of the interface module.

With this manufacturing method, the interface module does not require a supplementary film exclusively used for delimiting a frame in which the display member is visible, this film being replaced with a screen-printed ink layer which is thinner and less costly. The resulting interface module can therefore be thinner and less costly in the final analysis.

The method may also have one or more of the following characteristics, considered individually or in combination.

It further includes a supplementary step in which the transparent panel onto which the film has been bonded and laminated is placed in a vacuum to degas it by removing trapped bubbles.

The film used is a polarizing filter.

It includes a supplementary step in which a semitransparent ink is screen-printed onto portions of the film that are free of opaque ink.

It includes a supplementary step of applying a filling layer between the screen-printed ink or inks and the adhesive deposited between the film, on the same side as the screen-printed ink, and the transparent panel of the interface module.

The thickness of the filling layer is chosen to be between 5 and 50 micrometers so as to be equal to several thicknesses of screen-printed ink The filling layer is made in the form of an ultraviolet-hardening varnish, and the varnish is hardened before the bonding and lamination of the film.

The varnish used is low-viscosity and is highly wetting on the layer or layers of screen-printed ink.

The invention also relates to the interface module produced by said method, comprising a display member intended to be visible through a transparent panel, onto which a film is bonded and laminated, characterized in that the film includes a layer of screen-printed opaque ink to delimit frames or symbols.

The interface module may also have one or more of the following characteristics, considered singly or in combination.

The film includes a filling layer between the screen-printed ink or inks and the adhesive deposited between the film, on the same side as the screen-printed ink, and the transparent panel of the interface module.

The filling layer is made in the form of an ultraviolet-hardening varnish, hardened before the bonding and lamination of the film.

The varnish is low-viscosity and is highly wetting on the layer or layers of screen-printed ink.

The transparent panel is a touch panel.

The invention also relates to a transparent film intended to be placed in front of a display member, including on one face at least one layer of screen-printed ink as well as a filling layer between the screen-printed ink or inks.

The thickness of the filling layer is chosen to be between 5 and 50 micrometers so as to be equal to several thicknesses of screen-printed ink.

The filling layer is made in the form of an ultraviolet-hardening varnish, and the varnish is hardened before the bonding and lamination of the film bearing the layer or layers of screen-printed ink.

The varnish used is low-viscosity and is highly wetting on the layer or layers of screen-printed ink.

Other advantages and features of the invention will become apparent in the light of the description of the following drawings, provided by way of non-limiting examples.

In all the figures, the same references are applied to the same elements.

The surface of the display member in question is such that a perpendicular oriented positively toward the outside of the module, in the direction of the user, can be defined (at least locally). The terms "above", "below" and equivalent terms used hereafter will be defined with respect to this perpendicular.

Figure 1:
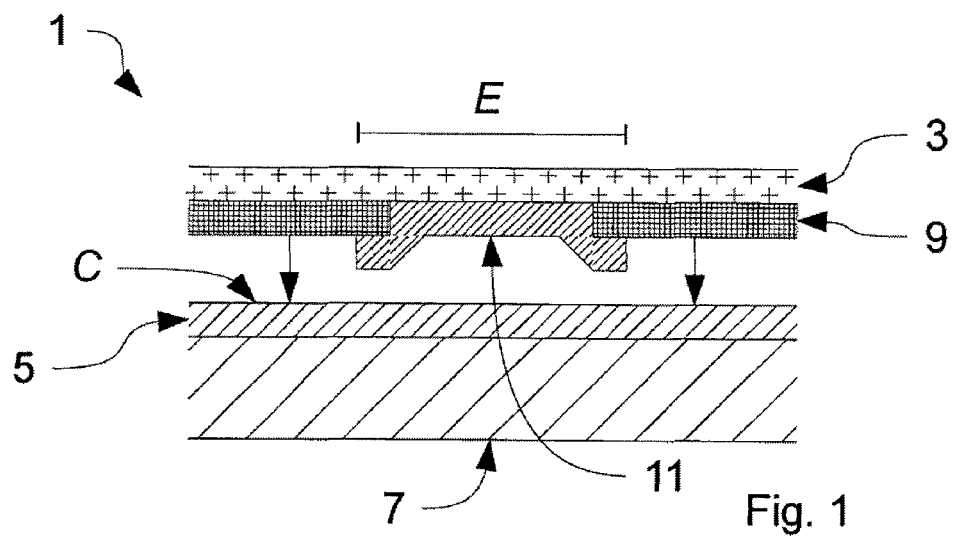
FIG. 1 is a sectional view of a display member of an interface module onto which a film is applied in the course of an embodiment of the method according to the invention.

FIG. 1 shows in a schematic way a sectional view of an interface module 1, including a film 3 which is in the process of being applied onto a transparent panel 5 of a display member 7 of the module 1, shown here in the form of a screen.

In this case, the transparent panel 5 is a touch panel, of the capacitive or resistive type for example, and is placed onto the upper surface of the display screen 7, which may, for example, be a liquid crystal, organic diode (OLED) or plasma screen. The display member 7 may, alternatively, be a light box, a light guide or a diffusing screen placed above a light source if no complex image is displayed thereon. The display member 7 is placed behind the panel 5, chosen to be transparent so that the user can see said display member 7 through the panel 5.

If the interface module 1 has no touch functionality, the panel 5 forms the uppermost layer applied to the underlying display member 7, for example a glass or polycarbonate sheet having a protective function.

The film 3 is, for example, a polarizing plastic film, which is flexible and relatively stretchable and has high transparency. On certain areas of its lower surface, the film 3 has opaque ink 9, applied by screen-printing, notably by means of stencils and squeegees. This opaque ink 9 is typically black ink, and serves to delimit the surface E of the final screen or of the desired symbol by outlining the display member 7 positioned below it.

In order to apply the ink 9, the film 3 is first placed with its lower face upward in the normal (terrestrial) frame of reference, is screen-printed, and is then turned over again before lamination.

The layers represented in FIG. 1 are not shown to scale. In particular, the film 3 has a thickness in the range from several hundred microns to several millimeters, while the thickness of the ink layers 9 is about five to fifty microns.

It is also possible, as shown in FIG. 1, to screen-print semitransparent ink 11, for example smoke-gray or colored ink, in the portions left without opaque ink 9, in order to modify the final appearance. To ensure that no space is left between the black ink and the second semitransparent ink generally used for displaying the symbols, it is preferable to overlap the black and semitransparent inks, as shown in FIG. 1. This overlap creates an excess thickness of the inks.

The film 3 bearing the screen-printed ink layers 9, 11 is then applied by lamination onto the panel 5, after adhesive C has been deposited between the panel 5 and the screen-printed ink layers 9, 11, for example by the application of adhesive C onto the upper surface of said panel 5. Clearly, it is possible, alternatively or in combination, to coat with adhesive the lower surface of the film 3 bearing the screen-printed ink layers 9, 11.

In order to remove any final air bubbles, the panel 5 bearing the film 3 is then placed in a vacuum and allowed to degas in a subsequent supplementary step, in a vacuum chamber for example.

The resulting interface module 1 has no film dividing up the surface of the screen or of the symbol E. Said surface E is outlined by opaque ink 9 screen-printed in a thin layer. This absence of a framing film enables the final thickness of the module 1 to be reduced by the thickness of the film.

Since the ink 9, 11 is screen-printed, the frame outlining the surface E can be produced in a simplified and potentially less costly manner. The film 3 is screen-printed in two layers of ink, namely an opaque layer 9 and a semitransparent layer 11. However, screen-printing does not enable the extent of the screen-printed layers to be limited in a very precise manner. Consequently, during the screen-printing of the layers 9, 11, it is advantageous to make said layers 9, 11 overlap each other slightly or even completely, at least in the area of their common edges.

Figure 2:
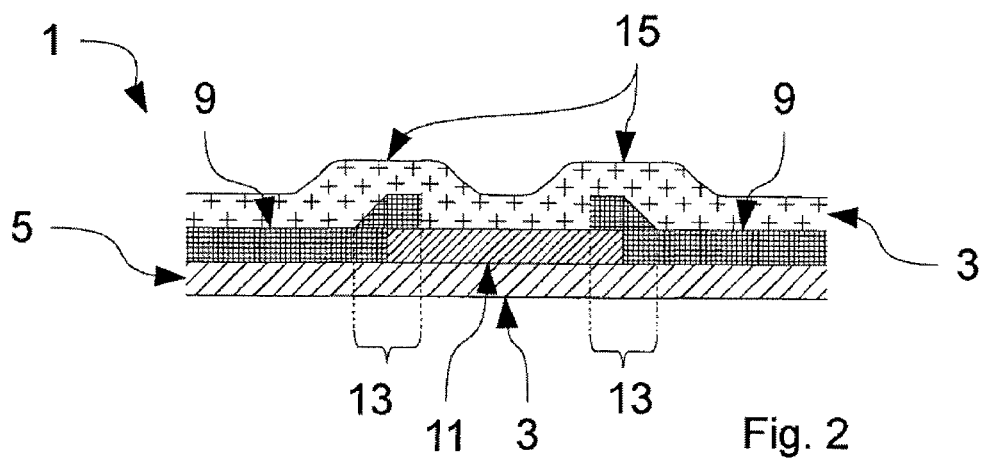
FIG. 2 is a sectional view of a display member of an interface module produced according to a second embodiment.

FIG. 2 shows in a more detailed way an interface module 1 produced by the steps described above, having a slight defect, known as sink marks.

The presence of areas without ink 9, 11, or the overlapping of the various ink layers 9 and 11 at their edges, creates differences in the thickness of the resulting module 1. These differences in thickness are known as sink marks.

FIG. 2 shows an interface module 1 in which the film 3 bears two ink layers 9, 11, which are respectively opaque and semitransparent. These two ink layers 9, 11, screen-printed one after another, overlap at their common edges 13. After lamination and degassing, these overlaps of the edges 13 cause the formation of protuberances 15 which form sink marks The latter are undesirable since they adversely affect the appearance of the interface module 1, notably by creating reflections and interference patterns.

Figure 3:
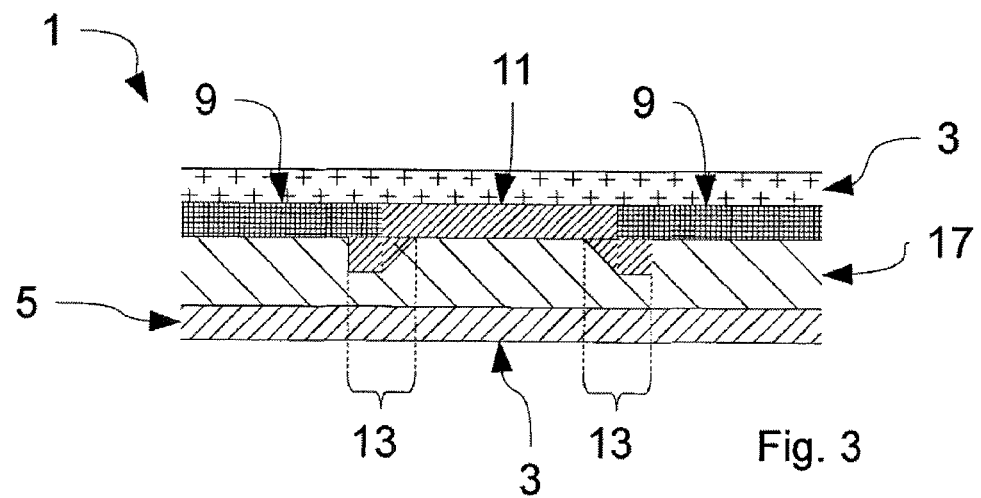
FIG. 3 is a sectional view of a display member of an interface module produced according to a third embodiment.

FIG. 3 shows an interface module 1 similar to that of FIG. 2, but in which the film 3 additionally bears a layer of filling varnish 17. This filling layer 17 is interleaved between the ink layers 9, 11 and the surface onto which the adhesive C of the panel 5 is deposited.

The filling layer 17 is composed of a varnish, chosen to have low viscosity and/or a high surface tension with the ink 9, 11 and/or the material bearing the film 3, so as to provide complete or practically complete wetting on the screen-printed ink layers 9, 11. Thus the varnish covers any crevices and protuberances, resulting in the formation of a film having a flat surface, while avoiding the inclusion of air bubbles.

Examples of such varnishes are fluids having a maximum viscosity of the order of several tenths of a poise (several 10 cP), particularly epoxy resins or polyethylene resins with suitable solvents and catalysts. The volume applied is chosen so that the final thickness of the filling layer 17 is approximately equal to the thickness of one to two layers of screen-printing, in other words typically several tens of microns, particularly about five to fifty.

After being applied uniformly, the varnish is hardened by treatment with ultraviolet radiation. This forms a filling layer 17 which fills the hollows and covers the protuberances. The resulting film 3, with the screen-printed inks 9, 11 and the varnish layer 17, is then laminated without any formation of sink marks.

Figure 4:
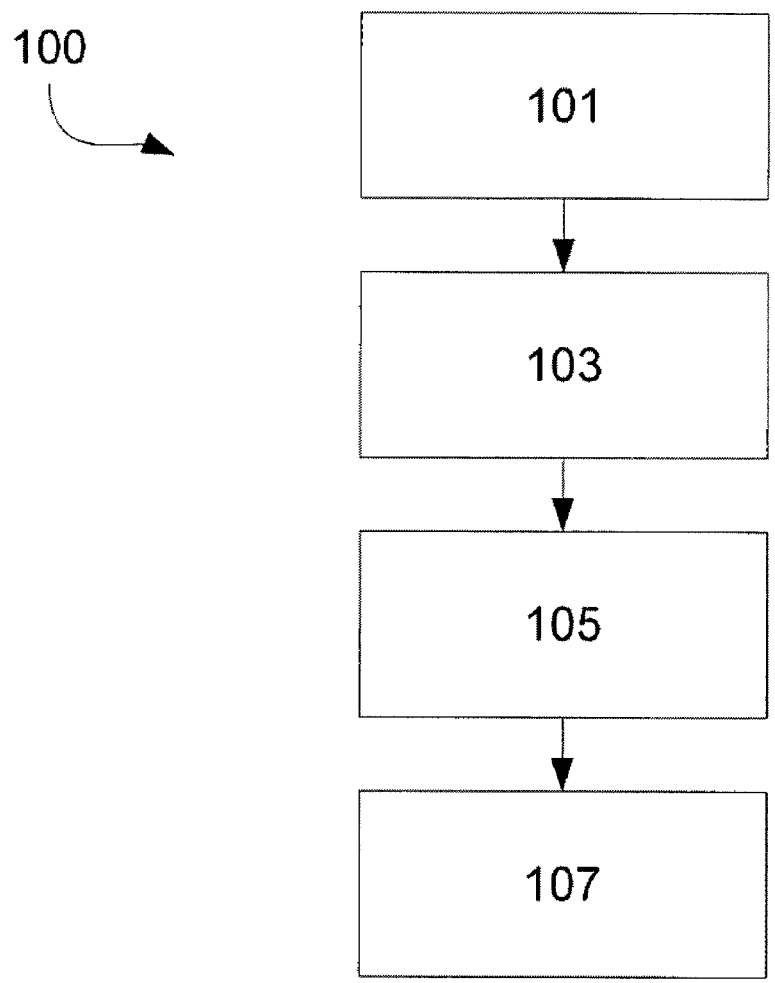
FIG. 4 is a simplified diagram of the various steps of the method.

FIG. 4 is a block diagram showing the various steps of the method 100 for manufacturing an interface module screen.

In the first step 101, the opaque ink 9 and the semitransparent ink 11 are screen-printed onto the surface of the film 3 intended to become the lower surface of the film, in order to delimit frames or symbols E.

In the next step 103, the filling layer 17 of UV-hardening varnish is applied onto the layers of screen-printed ink 9, 11 and is hardened by ultraviolet irradiation.

In the third step 105, adhesive C is deposited between the film 3, on the same side as the screen-printed ink 9, 11, and the panel 5 of the interface module 1, and the film 3 bearing the screen-printed ink layers 9, 11 is bonded and laminated onto the panel 5 of the interface module.

The adhesive C may be an adhesive film of the "double-sided" type, placed between two protective layers. In the context of the present use, one of the protective layers can be removed and the adhesive C can be initially laminated onto the protective film 3 bearing the screen-printed ink layers 9, 11. After this, the second protective layer is then removed and the film 3 bearing the screen-printed ink layers 9, 11 and the adhesive C is laminated onto the panel 5.

Finally, in step 107, the film 3 bearing the screen-printed ink layers 9, 11 bonded onto the panel 5 is put in a vacuum for degassing and thus evacuating any air bubbles trapped in any of the preceding steps.

The method according to the invention makes it possible to use the film 3 which is commonly used as a substrate for screen-printing opaque ink 9 forming the frame E of the screen 7 or delimiting symbols.

The method therefore potentially makes the resulting interface module 1 thinner and less costly.

The invention claimed is:

1. A method of manufacturing an interface module, the interface module comprising a display member visible through a transparent panel, the method comprising:
   screen-printing an opaque is onto predefined areas of a film to delimit frames or symbols;
   screen-printing a semitransparent ink onto portions of the film that are free of opaque ink;
   depositing adhesive between the film, on a same side as the screen-printed ink, and the transparent panel of the interface module; and
   bonding and laminating the film bearing the screen-printed ink onto the panel of the interface module.

2. The method as claimed in claim 1, further comprising placing the panel onto which the screen-primed film has been bonded and laminated in a vacuum to degas the panel by removing trapped bubbles.

3. The method as claimed in claim 1, wherein the film used is a polarizing filter.

4. A method of manufacturing an interface module, the interface module comprising a display member visible through a transparent panel, the method comprising:
   screen-printing an opaque ink onto predefined areas of a film to delimit frames or symbols;
   depositing adhesive between the film, on a same side as the screen-printed ink, and the transparent panel of the interface module;
   bonding and laminating the film bearing the screen-printed ink onto the panel of the interface module; and
   applying a filling layer between the screen-printed ink or inks and the adhesive deposited between the film, on a same side as the screen-printed ink, and the transparent panel of the interface module.

5. A method of manufacturing an interface module, the interface module comprising a display member visible through a transparent panel, the method comprising:
   screen-printing an opaque ink onto predefined areas of a film to delimit frames or symbols;
   depositing adhesive between the film, on a same side as the screen-printed ink, and the transparent panel of the interface module; and
   bonding and laminating the film bearing the screen-printed ink onto the panel of the interface module,
   wherein the thickness of a filling layer applied between the screen-printed ink and the adhesive deposited between the film is chosen to be between 5 and 50 micrometers so as to be equal to several thicknesses of screen-printed ink, and
   wherein the filling layer is made in the form of an ultraviolet-hardening varnish, and in that the varnish is hardened before the bonding and lamination of the film bearing the layer or layers of screen-printed ink.

6. The method as claimed in claim 5, wherein the varnish used is low-viscosity and is highly wetting on the layer or layers of screen-printed ink.

\* \* \* \* \*